3,225,100
NITROSOANILINONITROALKANES

Darrell D. Mullins, Nitro, W. Va., and Lloyd A. Walker, Akron, Ohio, assignors to Monsanto Company, a corporation of Delaware
No Drawing. Filed Feb. 12, 1964, Ser. No. 344,230
4 Claims. (Cl. 260—577)

This application is a continuation-in-part of application Serial No. 81,243, filed January 9, 1961, now U.S. Patent No. 3,151,161.

The present invention relates to nitrosoanilinonitroalkanes, to methods for their preparation and to promoting reaction of vulcanizable elastomers and reinforcing pigment by means of nitrosoanilinonitroalkanes.

It has long been known that rubbers may be altered by thermal treatment of an admixture with a relatively high proportion of reinforcing pigment, usually carbon black. The time required for external treatment may be materially shortened by carrying out the thermal interaction in the presence of organic catalysts or promoters. However, the alteration in properties is neither uniform nor necessarily even advantageous. Chemicals which catalyze the thermal treatment of one rubber may be severely detrimental to another. Some catalysts active in natural rubber proved inert in less saturated rubber like butyl rubber. Others useful for improving the hysteresis properties of butyl rubber gave little or no benefit with the more unsaturated rubbers and caused objectionable side reactions, as for example cross linking. The action of catalysts for low hysteresis processing has been explained on the basis of promoting reaction between rubber and carbon black. While the improved adjuvants provided by the present invention are presumed to function by similar mechanisms and are therefore described as promoters, this is not really known. The invention is not limited to any theory of the mechanism by which the new compounds impart the desirable properties hereinafter described in detail.

An object of the invention is to provide new chemicals which promote the low hysteresis of rubber vulcanizates. A general object of the invention is to improve the properties of natural and synthetic rubbers by means of special treating agents. Another object is to provide agents which increase the modulus, lower the torsional hysteresis and decrease the internal friction of rubber vulcanizates. A specific object is to promote reaction between rubber and carbon black or other reinforcing pigment by organic chemical catalysts. A further object is to provide promoters uniformly effective in rubber-carbon black mixtures. A further specific object is to improve dispersion of carbon black and other fillers in rubber.

Improved vulcanizates are obtained according to the present invention by incorporating into the rubber mixture a relatively large amount of reinforcing pigment, a small amount of a nitrosoanilinonitroalkane as hereinafter disclosed in detail and heating the mixture. Amounts of 0.1–5.0% of the rubber hydrocarbon comprise the practical useful range under most conditions. These are not the absolute limits and measurable effects are obtained with even smaller amounts. Similarly, larger amounts can be used but usually without advantage. The preferred range is 0.25–1.0%. Vulcanizing and other ingredients as desired are added, preferably after mixing rubber, reinforcing pigment and promoter. Any vulcanizing ingredients present during thermal interaction must be present in amounts below those which cause cure. In general, heat treatment can be carried out in an oven without mechanical agitation of the mixture. Another method is by heat treating the rubber mixture, reinforcing pigment and nitrosoanilinonitroalkane while subjecting it to mechanical agitation as in a Banbury mixer or on a mill. Heating is preferably within the range of 300–370° F. with heating times ranging from one minute to 16 hours. It is desirable to pre-heat the Banbury to at least 300° F. before charging the rubber and catalyst. The heat of mixing even with full cooling raises the temperature 20 to 40 degrees higher depending upon the initial temperature. The process can be completed in a normal mixing cycle after which vulcanizing ingredients are added. For plant scale operation short mixing cycles are desired.

Any of the rubber reinforcing pigments may be used in the practice of the present invention. These include reinforcing silica but carbon blacks are preferred. The amount and type of carbon black can be varied within wide limits. Usually it will be in the range of 25 to 100% of the rubber and normally 40–50 parts by weight in the case of tread stocks. Carbon black is generally added first in the mixing cycle and in the usual practice of the invention the promoter is added concomitantly with it. On the other hand, the promoter may be premixed with the carbon black and the mixture added to rubber. Alternatively, rubber and promoter are admixed followed by the carbon black and other ingredients as desired. However, the thermal treatment must be conducted in the presence of reinforcing pigment. Banbury mixing is advantageous because it exerts severe masticating action and achieves uniform dispersion of the ingredients within short mixing times. The dispersing action of the new compounds is pronounced.

The nitrosoanilinonitroalkanes of this invention contain a nitro substituent beta to the amino nitrogen, a methylene group attached to nitrogen and a nitroso substituent in the para position of the anilino radical. All three structural features are critical. For example, corresponding compounds lacking either the nitro or nitroso radical or in which the methylene group is replaced by methyl substituted methylene are in general inactive for promoting reaction of butyl rubber and carbon black. Surprisingly, the nitro substituent increases thermal stability of the molecule. Nitrosoanilinonitroalkanes of this invention possess the general formula

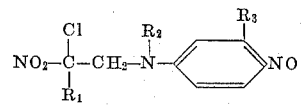

$R_1$ is lower alkyl, $R_2$ is hydrogen, lower alkyl, or nitroso and $R_3$ is hydrogen, chlorine, or lower alkyl. These compounds are preferably made from the corresponding N-nitroalkyl aniline by treating it with a nitrosating agent. The intermediates are conveniently prepared as hereinafter described.

The following examples are illustrative but not limitative of the preparation of the new compounds.

Example 1

The N-(2-chloro-2-nitrobutyl)aniline required for this example is prepared from aniline and 1-chloro-1-nitropropane as follows: A mixture of 93 grams (1.0 mole) of aniline, 123.5 grams (1.0 mole) of 1-chloro-1-nitropropane, 10 ml. of 25% sodium hydroxide solution and 300 ml. of water is heated with stirring to 90–95° C.

Thereupon there is added, dropwise over a period of 1.5 hours, 90 grams (1.1 moles) of 37% formaldehyde. The resulting mixture is then stirred for an hour at 95–98° C., allowed to stand overnight, and then heated at refluxing temperature for 3 hours. Upon cooling to 0–5° C. the organic layer separates. The aqueous layer is extracted with 200 ml. of ether and the extract added to the organic layer. After drying over sodium sulfate and filtering through clay, the ether is removed in vacuo (40–50° C./ 12–14 mm.) to give a viscous dark oil. To this oil is added approximately 100 ml. of methyl alcohol and the solution warmed to 40–50° C. Upon cooling and scratching with a glass rod, N-(2-chloro-2-nitrobutyl)aniline precipitates as a tan crystalline solid. On recrystallization from heptane it is obtained as a light yellow solid melting at 47–48° C. Replacing aniline in the foregoing procedure by m-chloroaniline and m-toluidine yields, respectively, N-(2-chloro-2-nitrobutyl)-3-chloroaniline and N-(2-chloro-2-nitrobutyl)-3-methylaniline, both of which are low-melting solids.

To a stirred solution of 45.6 grams (0.2 mole) of N-(2-chloro-2-nitrobutyl)aniline in 150 ml. of glacial acetic acid is added, below the surface, a solution of 15 grams (0.21 mole) of 98% sodium nitrite in 30 ml. of water, over a period of 45 minutes at 18–20° C. After removing external cooling the temperature rises to 25° C. The reaction mixture is stirred for 1.5 hours at 25–30° C., cooled to 0° C. and then discharged into 1,000 ml. of ice water. The solution is stirred for 30 minutes, the solid removed by filtration, washed free of chlorides with cold water and air-dried at room temperature. N-(2-chloro-2-nitrobutyl)-N-nitrosoaniline is obtained as a white solid melting at 39–41° C.

To 34 grams (0.132 mole) of the N-(2-chloro-2-nitrobutyl)-N-nitrosoaniline in 150 grams of glacial acetic acid is added, dropwise with stirring at 10–20° C., 132 grams (1.32 moles) of concentrated hydrochloric acid. After the addition, which requires 30 minutes, the temperature is raised to 27° C. and the reaction stirred at 25–30° C. for 1.5 hours. The reaction is then cooled to 0° C., the solid collected by filtration and washed with ether. The dry salt cake is placed in 2500 ml. of ice water and neutralized to a pH of 8 with concentrated ammonium hydroxide. The resulting green solid is collected by filtration, washed well with cold water and air-dried at room temperature. N - (2-chloro-2-nitrobutyl)-p-nitrosoaniline is obtained melting at 98–99° C. after recrystallization from toluene. Analysis gives 16.45% nitrogen (Dumas) compared to 16.35% calculated for $C_{10}H_{12}ClN_3O_3$. A second nitrosation in glacial acetic acid by the procedure described for the aforesaid N-nitrosoaniline yields N-(2-chloro-2-nitrobutyl) - N,4 - dinitrosoaniline as a light-colored solid.

*Example 2*

The N-(2-chloro-2-nitropropyl)aniline required for this example is prepared as follows: A mixture of 46.5 grams (0.5 mole) of aniline, 54.8 grams (0.5 mole) of 1-chloro-1-nitroethane, 5 ml. of 25% sodium hydroxide and 250 ml. of water is heated to 60° C. The solution is then stirred at 60–95° C. while adding, dropwise over a period of one hour, 45 grams (0.56 mole) of 37% formaldehyde. The reaction is then stirred at 90–95° C. for 3 hours, cooled to 50° C. and transferred to a separatory funnel. The organic layer is drawn off and retained. To the dark viscous mixture is added 50 ml. of ethyl alcohol and 100 ml. of heptane. The mixture is then heated with decolorizing charcoal, filtered through clay and the filtrate cooled in an ice bath at 0° C. Brownish yellow crystals form which are collected by filtration. After washing on the filter with heptane, the solid is air-dried at room temperature.

To 42 grams (0.2 mole) of the N-(2-chloro-2-nitropropyl)aniline so prepared is added 60 grams of methyl alcohol, the solution is then cooled to 0° C. and 300 grams (3.0 moles) of concentrated hydrochloric acid is added in one portion. The maximum temperature reached is 32° C. After cooling to 19° C., 15 grams (0.21 mole) of 98% sodium nitrate dissolved in 30 ml. of water is added dropwise at 25–30° C. in 30 minutes and stirring continued at 30–33° C. for 3 hours. The mixture is then cooled to 0° C., stirred for 15 minutes, the solids collected by filtration and washed with 50 ml. of cold water. After adding 80 ml. of acetone to the mixture and neutralizing to a pH of 8 with 25% sodium hydroxide, the solid is filtered out, washed by re-slurrying in 580 ml. of water, the solid again filtered out, washed with 300 ml. of cold water, and then air-dried at room temperature. N-(2-chloro-2-nitropropyl)-p-nitrosoaniline is obtained as a green solid melting at 100–101° C. after recrystallization from ethyl alcohol. N-(2-chloro-2-nitropropyl)-3-chloro-4-nitrosoaniline and N-(2-chloro-2-nitropropyl)-3-methyl-4-nitrosoaniline are obtained in similar manner by replacing aniline with m-chloroaniline and m-toluidine, respectively.

As illustrative of the desirable properties imparted to rubber compositions by the new adjuvants, smoked sheet rubber, 1400 parts by weight, are added to a Banbury mixer and mixed for 6 minutes at 150° C. Zinc oxide, stearic acid, and a 400-parts-by-weight portion of the pre-masticated natural rubber are added to a Banbury mixer preheated to 150° C. and mixed for one minute at third speed. The chemical to be tested is mixed with the carbon black and one-half of this mixture and the aromatic oil added to the Banbury and mixing continued for one minute at third speed. The other half of the carbon black mixture is then added and mixing continued for two minutes at third speed. The Banbury is then swept down and mixing continued one to two minutes at third speed. The stock is then transferred to a rubber mill and blended. The remaining ingredients are added on the mill at 25° C. Final compositions were as follows:

|  | Stock (Parts by weight) | |
| --- | --- | --- |
|  | A | B |
| Pre-masticated smoked sheets | 100 | 100 |
| Promoter |  | 0.33 |
| Carbon black (high abrasion furnace) | 50 | 50 |
| Aromatic oil | 5 | 5 |
| Zinc oxide | 3 | 3 |
| Stearic acid | 2 | 2 |
| Sulfur | 2 | 2 |
| N-tert.-butyl 2-benzothiazolesulfenamide | 0.4 | 0.4 |

The stocks are cured in the usual manner by heating in a press 30 minutes at 144° C. The modulus of elasticity at 300% elongation is determined in the usual manner. Torsional hysteresis is determined at room temperature with an apparatus which embodies a torsional pendulum. In this apparatus the sample of rubber tested supplies the force to restore the pendulum when it is deflected. The logarithmic decrement of the observed amplitude is recorded. Heat rise after flexing in a Goodrich flexometer at 100° C. is also determined. The results are recorded below:

| Promoters | 300% Modulus | Torsional Hysteresis | Heat Rise, ° C. |
| --- | --- | --- | --- |
| None | 2,020 | .191 | 33 |
| N-(2-chloro-2-nitrobutyl)-p-nitrosoaniline | 2,450 | .129 | 28 |
| N-(2-chloro-2-nitrobutyl)-N-methyl-p-nitrosoaniline | 2,320 | .140 | 30 |
| N-(2-chloro-2-nitrobutyl)-N,4-dinitrosoaniline | 2,400 | .145 | 30 |

The chemical adjuvants of this invention are also useful in synthetic rubbery homopolymers of aliphatic conjugated diene hydrocarbons, as for example cis-polybutadiene, cis-polyisoprene, and in synthetic rubbery copolymers containing 50% or more of such diolefin hydrocarbons copolymerized with copolymerizable monoolefinic compounds, as for example styrene, acrylonitrile, and monovinylpyridine. The compounds also increase modulus, lower torsional hysteresis, and decrease the internal friction of butyl rubber vulcanizates. To illustrate these advantages, butyl rubber stocks comprising—

|  | Stock (Parts by weight) | | | |
| --- | --- | --- | --- | --- |
|  | C | D | E | F |
| Butyl rubber 218 | 100 | 100 | 100 | 100 |
| N-(2-chloro-2-nitrobutyl)-p-nitrosoaniline |  | 0.5 |  |  |
| N-(2-chloro-2-nitropropyl)-p-nitrosoaniline |  |  | 0.5 |  |
| N-(2-chloro-2-nitropropyl)-3-chloro-4-nitrosoaniline |  |  |  | 0.5 | are prepared in a Banbury mixer preheated to a temperature of 300° F. After heating and mixing the compositions for one and one-half minutes, full cooling is turned on and there is added—

|  | Stock (Parts by weight) | | | |
| --- | --- | --- | --- | --- |
|  | C | D | E | F |
| Carbon black (intermediate super abrasion furnace) | 30 | 30 | 30 | 30 |
| Zinc oxide | 5 | 5 | 5 | 5 |
| Stearic acid | 1 | 1 | 1 | 1 | and mixing continued for another three and one-half minutes. There is then added—

|  | Stock (Parts by weight) | | | |
| --- | --- | --- | --- | --- |
|  | C | D | E | F |
| Carbon black (intermediate super abrasion furnace) | 10 | 10 | 10 | 10 |
| Aromatic oil | 10 | 10 | 10 | 10 | and mixing continued for two minutes. The Banbury is swept down and mixing continued for one minute. The stocks are then transferred to a rubber mill and blended with the vulcanizing ingredients comprising—

|  | Stock (Parts by weight) | | | |
| --- | --- | --- | --- | --- |
|  | C | D | E | F |
| Sulfur | 0.5 | 0.5 | 0.5 | 0.5 |
| Tellurium diethyldithiocarbamate | 1.25 | 1.25 | 1.25 | 1.25 |
| 2,2'-dithiobis(benzothiazole) | 1.0 | 1.0 | 1.0 | 1.0 |

The stocks are vulcanized by heating 40 minutes at 153° C. and physical properties tested with the results recorded below:

| Stock | 300% Modulus | Torsional Hysteresis | Heat Rise, °C. |
| --- | --- | --- | --- |
| C | 360 | 0.330 | 55 |
| D | 750 | 0.182 | 23 |
| E | 680 | 0.192 | 23 |
| F | 650 | 0.191 | 23 |

It is intended to cover all changes and modifications of the examples of the invention herein chosen for purposes of disclosure which do not constitute departures from the spirit and scope of the invention.

What is claimed is:

1. A compound of the formula

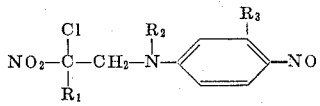

where $R_1$ is lower alkyl, $R_2$ is selected from a group consisting of hydrogen, lower alkyl, and nitroso and $R_3$ is selected from a group consisting of hydrogen, chlorine, and lower alkyl.

2. A compound of the formula

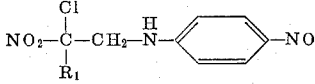

where $R_1$ is lower alkyl.

3. A compound of the formula

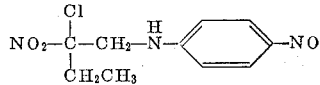

4. A compound of the formula

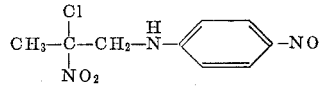

References Cited by the Examiner

UNITED STATES PATENTS

| 2,447,653 | 8/1948 | Johnson | 260—576 XR |
| 3,005,026 | 10/1961 | Gordon | 260—577 |
| 3,036,051 | 5/1962 | D'Amico | 260—85.3 |
| 3,091,603 | 5/1963 | Kuntz | 260—85.3 |
| 3,121,746 | 2/1964 | Pawloski | 260—577 |

CHARLES B. PARKER, *Primary Examiner.*

JOSEPH L. SCHOFER, *Examiner.*